Figures 1, 2, 3:
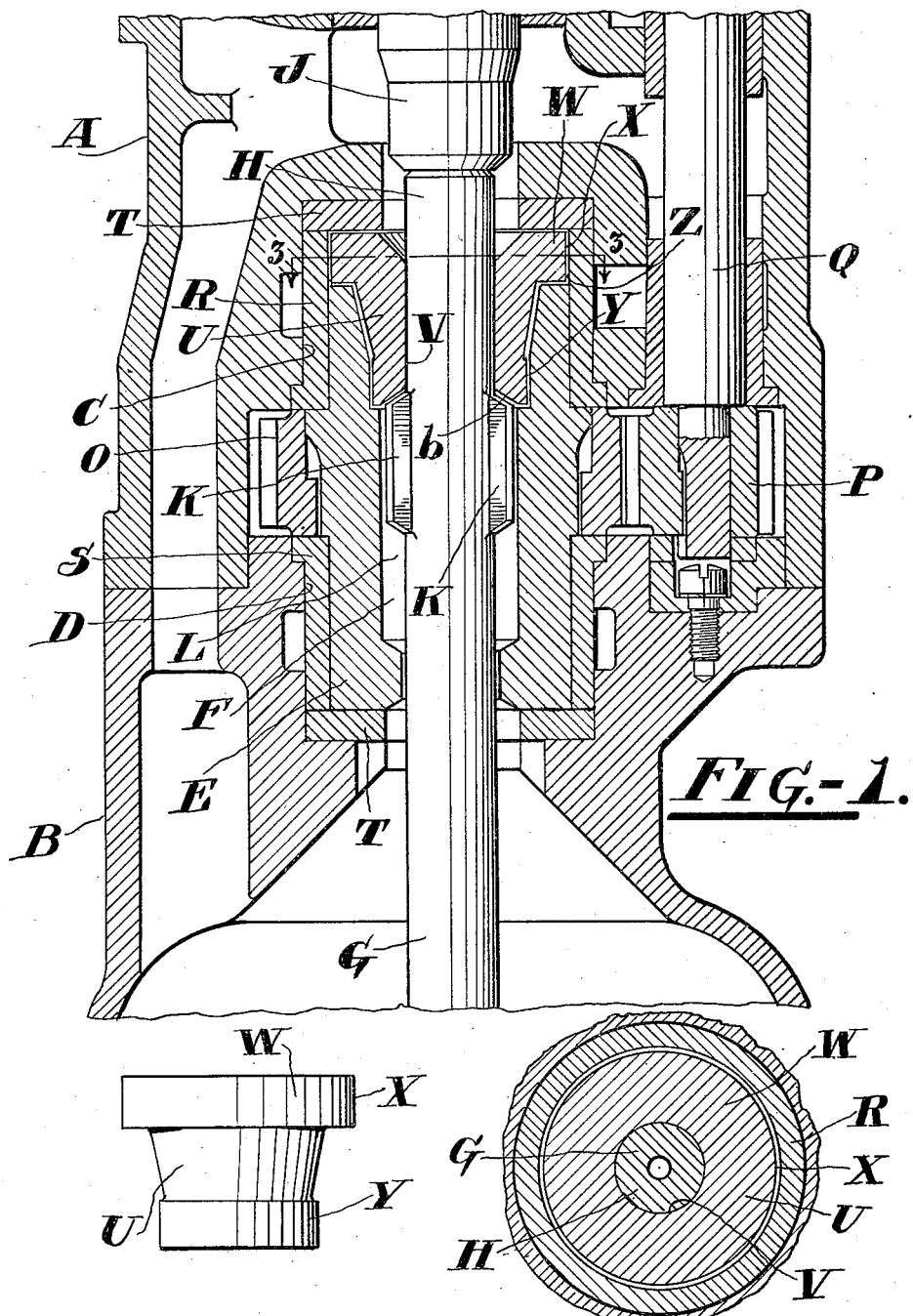

June 4, 1929.  C. C. HANSEN  1,715,359
CHUCK MECHANISM FOR ROCK DRILLS
Filed July 13, 1928

INVENTOR.
Charles C. Hansen
BY
HIS ATTORNEY.

Patented June 4, 1929.

1,715,359

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

CHUCK MECHANISM FOR ROCK DRILLS.

Application filed July 13, 1928. Serial No. 292,490.

This invention relates to rock drills, but more particularly to chuck mechanism for rock drills of the type in which the working implement is independently reciprocable with respect to the hammer piston whereby the working implement is actuated.

One object of the invention is to prolong the period of usefulness of the chuck mechanism, and more particularly of the chuck bushing which forms an abutment for the lugs of the working implement to limit the distance which the working implement may extend into the rock drill.

Other objects will be in part obvious and in part pointed out hereinafter.

In the drawings illustrating a preferred form of the invention and in which similar reference characters refer to similar parts, Figure 1 is a sectional elevation of so much of a rock drill as will serve to illustrate the invention, Figure 2 is a side elevation of the chuck bushing, and Figure 3 is a transverse view taken through Figure 1 on the line 3—3 looking in the direction indicated by the arrows.

Referring more particularly to the drawings, A designates a front head and B a cap for the front head which may be secured to the front head in any suitable manner.

The front head A and the cap B in this instance are provided with coaxial bores C and D respectively for the reception of a chuck E adapted to partly lie with opposite ends in the bores C and D. The chuck E is provided with a cavity F for the reception of a working implement G, such as a drill steel, which in this instance extends with its shank H beyond the rearward end of the chuck E to receive the blows of a hammer piston J.

The shank H of the working implement illustrated is of the Leyner type and accordingly has lugs K which lie in the cavity F and interlockingly engage ribs L in the cavity F. In this way the working implement G and the chuck E will rotate in unison. The cavity F, however, is of such length that the lugs K, together with the drill steel G, will be capable of considerable longitudinal movement with respect to the chuck E.

The chuck mechanism shown is of the type which is adapted to be rotated for the purpose of constantly changing the position of the working implement G in the drill hole for each blow of the hammer piston J. To this end a ring gear O is disposed about the chuck E to mesh with a pinion P keyed to a shaft Q which extends in a rearwardly direction and may be connected to a suitable power device, such as a gear motor (not shown). The ring gear O is illustrated as being in splined engagement with the chuck E to prevent relative rotation between the ring gear and the chuck.

In order to protect the casing parts, such as the front head A and the cap B against the effects of wear which would otherwise be caused by the chuck, wearing bushings R and S are disposed in the bores C and D respectively to form bearing surfaces for the adjacent ends of the chuck E. For a similar purpose plates T are disposed in the innermost ends of the bores C and D. The plate T in the bore D serves as a seat for the front end of the chuck E and the plate T in the bore C is disposed between the wearing bushing R and the roof of the bore C.

In accordance with the practice of the invention, a chuck bushing U is disposed in the rearward end of the chuck E and has a bore V to slidably receive the shank H of the working implement for which it forms a guide to maintain said working implement in alignment with the hammer piston J. The chuck bushing U is preferably provided at its rearward end with a flange W which lies between the rearward end of the chuck E and the plates T and has a bearing surface X on its periphery to cooperate with the bore C or, as in the present construction, with the wearing bushing R to maintain the chuck bushing U and therefore the working implement G in coaxial relation with the chuck E.

On the front end of that portion of the bushing U which extends into the chuck E is a peripheral bearing surface Y which also cooperates with the chuck E to centralize the bushing relatively to the chuck.

Unlike the usual type of chuck bushing used for the purpose described the present chuck bushing is so formed that it may rotate freely relatively to the chuck. The portions of the chuck bushing, such as the bearing surfaces X and Y, are of such proportions that there will be a slight clearance between these surfaces and those surfaces of the adjacent parts wherewith they are intended to cooperate. In the drawings the clearance designated by Z is somewhat exaggerated. It should be understood, however, that this clearance should only be of sufficient extent to enable the chuck bushing U to rotate freely in the chuck E.

In order to provide a suitable bearing surface for the rearward ends of the lugs K of the working implement, the forward end of the chuck bushing U is provided with a conical seating surface $b$ corresponding to the adjacent surfaces of the lugs K.

As has been previously intimated, it is customary to fixedly secure the chuck bushing in the chuck, and as a result, the lugs K of the working implement will bear only against a certain point on the conical seating surface $b$. After prolonged use of the drilling mechanism, the points against which the lugs K strike will become worn to an extent which necessitates removal of the chuck bushing. The present invention is intended to overcome this undesirable condition and therefore to reduce the cost of maintenance of the chuck mechanism by enabling the chuck bushing U to rotate freely in the chuck E. Any slight relative rotative movement between the chuck E and the working implement G will tend to change the position of the chuck bushing in the chuck. As a result the wear which is ordinarily confined to a single point on the chuck bushing will be distributed over the entire area of the conical seating surface $b$ and the chuck bushing will therefore be capable of a longer period of service than are structures in which the chuck bushing is secured fixedly to the chuck.

I claim:

1. In a rock drill, the combination of a front head and a working implement, lugs on the working implement, a chuck having a cavity to receive the working implement and the lugs, and a chuck bushing disposed loosely in the chuck to form an abutment for the lugs.

2. In a rock drill, the combination of a front head and a working implement, lugs on the working implement, a chuck having a cavity to receive the working implement and the lugs, and a chuck bushing disposed loosely in the rearward end of the chuck to form an abutment for the lugs.

3. In a rock drill, the combination of a front head and a working implement, lugs on the working implement, a bore in the front head, a chuck in the bore having a cavity to receive the working implement and the lugs, a chuck bushing disposed loosely in the chuck to form an abutment for the lugs, and bearing surfaces at the ends of the chuck bushing, one of said bearing surfaces cooperating with the cavity and the other bearing surface cooperating with the bore to maintain the chuck bushing coaxial with the chuck.

4. In a rock drill, the combination of a front head and a working implement, lugs on the working implement, a bore in the front head, a chuck in the bore having a cavity to receive the working implement and the lugs, a chuck bushing disposed loosely in the chuck to form an abutment for the lugs, a bearing surface on one end of the chuck bushing extending into the chuck, and a bearing surface of greater area at the other end of the chuck bushing cooperating with the bore to maintain the chuck bushing coaxial with the chuck.

5. In a rock drill, the combination of a front head and a working implement, lugs on the working implement, a bore in the front head, a chuck in the bore having a cavity to receive the working implement and the lugs, a chuck bushing disposed loosely in the chuck to form an abutment for the lugs, a bearing surface on one end of the chuck bushing extending into the chuck, a flange at the other end of the chuck bushing overlying the end of the chuck, and a bearing surface on the periphery of the flange cooperating with the bore to maintain the chuck bushing in coaxial relationship with the chuck.

In testimony whereof I have signed this specification.

CHARLES C. HANSEN.